United States Patent
Hammond et al.

(10) Patent No.: US 8,389,585 B2
(45) Date of Patent: *Mar. 5, 2013

(54) SLURRY REACTOR FINES SEGREGATION AND REMOVAL

(75) Inventors: David G. Hammond, Fairfax, VA (US); Jorge L. Soto, Centreville, VA (US); F. Craig Moates, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/657,694

(22) Filed: Jan. 26, 2010

(65) Prior Publication Data

US 2010/0210739 A1    Aug. 19, 2010

Related U.S. Application Data

(60) Provisional application No. 61/207,722, filed on Feb. 13, 2009.

(51) Int. Cl.
*C07C 27/00*     (2006.01)
*B03B 7/00*      (2006.01)

(52) U.S. Cl. ........... 518/700; 209/12.1; 209/12.2
(58) Field of Classification Search ........... 518/700; 209/12.1, 12.2
See application file for complete search history.

(56) References Cited

U.S. PATENT DOCUMENTS

| 5,382,748 A | 1/1995 | Behrmann et al. |
| 5,770,629 A | 6/1998 | DeGeorge et al. |
| 5,866,621 A * | 2/1999 | Behrmann et al. ............. 518/706 |
| 2005/0109715 A1* | 5/2005 | Stoy et al. ..................... 210/787 |

FOREIGN PATENT DOCUMENTS

| EP | 0952132 A1 | 10/1999 |
| FR | 2802828 A1 | 6/2001 |
| WO | 9731693 A1 | 9/1997 |
| ZA | 200007693 | 6/2002 |

* cited by examiner

*Primary Examiner* — Jafar Parsa

(57) ABSTRACT

The embodiments of the present invention are characterized by degasifying a portion of a gas and slurry mixture in a three-phase slurry process and lowering the solids content of the degassed slurry portion to below about 20 wt %. The degassed and lowered solids content slurry portion is then introduced into a fines separation device for separation and removal of fines. The foregoing procedure has been found to increase the effectiveness of the fines separation device.

17 Claims, 5 Drawing Sheets

SLURRY REACTOR FINES SEGREGATION AND REMOVAL

Non Provisional Application based on U.S. Ser. No. 61/207,722 filed Feb. 13, 2009.

FIELD OF THE INVENTION

The present invention relates to a method and apparatus for separating fine solid particles from a slurry of liquid and bulk catalyst particles. In particular, this invention relates to the use of such a method and apparatus in a process for the synthesis of hydrocarbons in which a mixture of hydrogen and carbon monoxide are contacted with a slurry of catalyst particles in a liquid in a three-phase slurry reactor.

BACKGROUND OF THE INVENTION

Slurry processes, particularly those occurring in bubble columns, are widely reported in scientific literature and, hence, are known to those skilled in the art. An example of such a slurry process is the production of hydrocarbons by means of the Fischer-Tropsch process.

Typically, a Fischer-Tropsch process is conducted by contacting a stream of synthesis gas (comprised mostly of hydrogen and carbon monoxide) with a liquid suspension of solid catalyst. The gas phase generally will have an $H_2/CO$ molar ratio of from 1:1 to 3:1. The dispersing liquid is primarily a mixture of linear paraffinic hydrocarbon reaction product. The gas is fed into the bottom of a "bubble column reactor" through a gas distributor which produces small gas bubbles that operate to suspend the catalyst particles in the liquid. As the synthesis gas rises through the column, it is converted mainly to hydrocarbon products that are liquids under the reaction temperature and pressure conditions. Those gaseous products that are formed rise to the top of the reactor from which they are removed.

Because it is necessary to maintain the slurry in the reactor at a constant level, liquid products are continuously or intermittently removed from the reactor. In doing so, however, it is important to separate dispersed catalyst particles from the liquid being removed to maintain a constant inventory of to catalyst in the reactor. Generally, the separation is conducted in a filtration zone located in the slurry bed. The filtration zone typically comprises cylindrical filtering media through which liquid product passes from the exterior to the interior where it is collected and removed from the reactor. In some reactor designs, liquid product is filtered in an external filtration zone and the separated catalyst is returned to the reactor.

One of the problems associated with filtration systems is the decrease in filter efficiency over time which necessitates remedial action such as backwashing the filter media, removing and cleaning the filter element or replacing it. The decrease in filter efficiency is due mainly to the presence in the liquid product of very small catalyst particles known as "fines," which create an increasingly impervious solids cake over the filter requiring increasingly frequent backwashing, and which over time plug the filters. The presence of catalyst fines in the reactor is due to the attrition of the catalyst that occurs over time under the turbulent hydrodynamic conditions existing in the reactor vessel.

A number of ways have been proposed to remove fines, but these have not been satisfactory. For example, gravitational settlers have been proposed, but because the fine particles are so small, they do not settle out in a practical time period. Magnetic separation has also been proposed but has proven to be ineffective. Use of inclined plates, hydrocyclones and similar separation devices also are inefficient in separating fines from coarse particles particularly at high slurry solid loadings. Consequently, there is a need for increasing the effectiveness of separating catalyst fines from a slurry of bulk catalyst in a three-phase process containing gas and slurry.

SUMMARY OF THE INVENTION

Therefore, the present invention provides methods and apparatus for separating catalyst fines from a slurry of bulk catalyst in a three-phase process containing gas and slurry. The embodiments of the invention are characterized by degasifying a portion of the slurry lowering the solids loading in the degassed slurry to less than about 20 wt % and passing the lowered solids-loaded slurry to a fines separation device for separation and removal of the fines.

The preferential segregation and removal of catalyst fines from the reactor slurry increases the time period at which the primary filter system, i.e., the system used for separating liquid product from bulk catalyst in a three-phase gas and slurry process, performs at an acceptable level of effectiveness. Importantly, the invention also enhances the effectiveness and efficiency of fines separation systems used in three-phase gas and slurry processes.

The various embodiments of the invention will be described in the detailed description which follows.

DETAILED DESCRIPTION OF THE INVENTION

Figure 1:
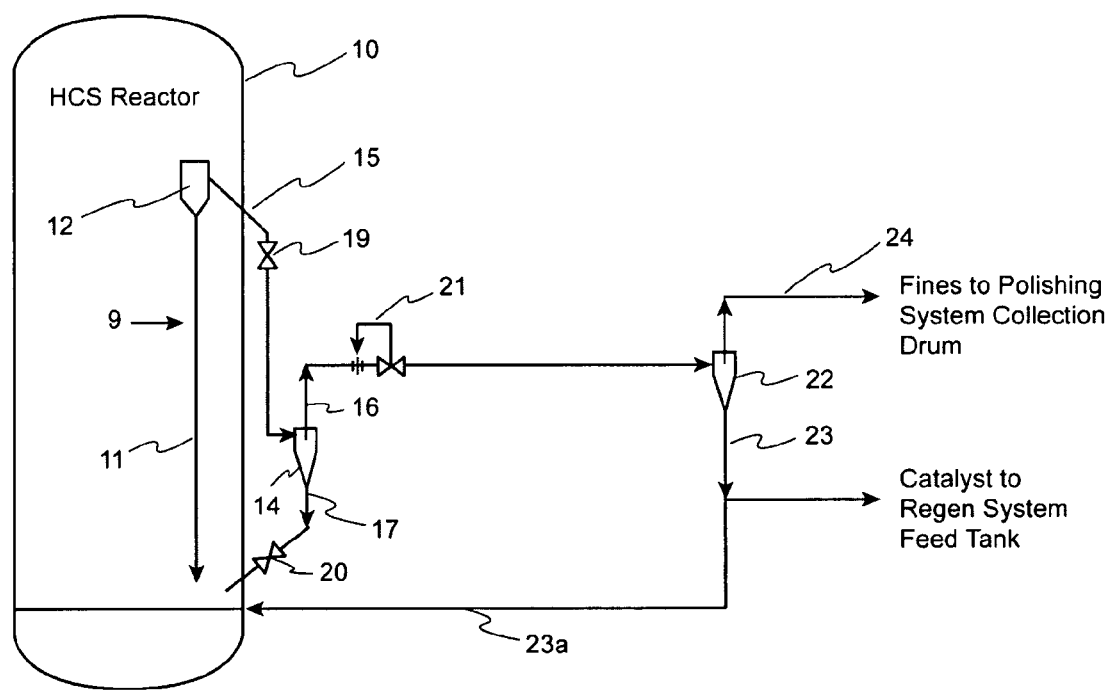
FIG. 1 is a schematic illustration of a fines separation system for a three-phase gas and slurry process including a hydrocyclone for separating a degassed slurry into a fines-containing stream and a coarse catalyst-rich stream in accordance with the present invention.

The present invention is applicable to chemical reactions which are carried out in a three-phase gas and slurry reactor. A specific example of such reactions is the Fischer-Tropsch synthesis process, and for convenience, the invention will be described by specific reference to the Fischer-Tropsch hydrocarbon synthesis process.

Suitably, the reactor for the Fischer-Tropsch synthesis process is a bubble reactor comprising a vertical vessel for containing a catalyst suspended in a liquid phase through which synthesis gas is bubbled.

Also suitably, the reactor will include one or more gas disengaging vertical downcomers which assist in the circulation of slurry through the reactor.

Typically, the reactor also will contain a filtration system comprising one or more porous filter media which permit liquid to pass through for removal. Optionally, of course, the filter system may be located outside of the reactor. In either instance, the filtrate normally is sent to further processing and upgrading.

As indicated previously, the synthesis gas comprises $H_2$ and CO in the molar ratio of 1:1 to 3:1 and preferably 2.1:1.

Any catalyst capable of being active in the Fischer-Tropsch reaction can be used in the present invention. Preferably, the catalyst will comprise effective amounts of Co or Fe and one or more of Re, Ru, Fe, Ni, Th, Zr, Hf, U, Mg and La on a suitable inorganic support material. Those linear hydrocarbon reaction products that are liquids at reaction conditions comprise the slurry liquid in the reactor.

The Fischer-Tropsch reaction is carried out at temperatures, pressures, and hourly gas space velocities in the range of about 320°-850° F., 80-600 psig and 100-40,000 V/hr/V, expressed as normal volumes of the syngas mixture (0° C., 1 atm) per hour per volume of catalyst, respectively.

The method and apparatus will first be described by reference to FIG. 1. As shown, the fines withdrawal system comprises a downcomer 9 located within bubble column reactor vessel 10. Downcomer 9 comprises section 11 that is provided with means for degassing a portion of the slurry, in this instance shown as a gas disengaging top cup 12 on downcomer 9. Basically, the means for degassing this portion of slurry should be sufficient to reduce any gas interference with the operation of solid-liquid separation devices. Preferably about 80 vol % of the gas, more preferably about 90 vol % of the gas, and most preferably substantially all of the gas should be removed in the degassing means.

In the practice of the present invention the solids loading in degassed slurry is then lowered to less than about 20 wt %, preferably less than about 15 wt %, and more preferably less than about 10 wt %. In the FIG. 1 embodiment, gas disengaging top cup 12 not only operates to remove the requisite amount of gas from the slurry but also to lower the solids loading of the slurry in the cup because the decreased turbulence in the cup permits coarse solids to settle out and return via downcomer 9 into the main slurry body.

A hydrocyclone 14 is in operable communication with gas disengaging cup 12 of downcomer 11 via conduit 15.

Hydrocyclones are devices in which a liquid feed is subjected to centrifugal forces by a rotating movement of the feed caused by either a tangentially directed inlet, or by vanes in an axially directed inlet. During the rotating movement, liquid with heavier particles concentrates at the wall of the hydrocyclone, while liquid with finer suspended particles concentrates at the center of the hydrocyclone. In tangentially directed inlet hydrocyclone the liquid with the finer suspended particles is removed at the head of the hydrocyclone, while the larger particles are removed at the bottom of the hydrocyclone. In an axial hydrocyclone, the larger particles are removed from the region close to the wall, while the fines particles are removed from a region in the center of the hydrocyclone. Both types of hydrocyclones can be used in this invention. In the descriptions that follow, it will be presumed that the hydrocyclone has a tangential feed inlet.

As shown in FIG. 1, the hydrocyclone 14 used in this illustration has a tangential feed inlet, and thus has a top conduit 16 for removal of an overflow stream and a bottom conduit 17 for removal of an underflow stream.

Optionally, hydrocyclone 14 may be located within reactor 10, but preferably, it is located outside of reactor 10 as shown in FIG. 1.

Also as shown in FIG. 1, conduit 17 is in operable communication with vessel 10.

Valves 19 and 20 may be provided, as shown, for metering degassed slurry from cup 12 to through hydrocyclone 14 when required, or for isolation in case maintenance is required.

Although the fines separation device in FIG. 1 is a hydrocyclone 14, it should be readily appreciated that other liquid-solids separation devices, such as inclined plates, wedge wire filters and the like, may be employed.

In operation, a portion of the gas and slurry in the reactor 10 enters the gas disengaging cup 12 to provide a degassed slurry. Because of the decreased turbulence therein, coarse solids will settle in the cone of cup 12 to provide a slurry with lowered solids loading. The coarse solids that settle out in cup 12 are returned to the main slurry body via downcomer 9. The lowered solids loaded slurry is fed to the fines separation device, hydrocyclone 14, for lowering the solids loading of the degassed slurry. Basically, the rate of withdrawal from cup 12 will be a function of the downcomer hydraulics. In any event, an overflow stream containing fines is removed from the hydrocyclone for further concentration and separation while the underflow stream rich in coarse catalyst is returned to the reactor 10.

By coarse catalyst is meant catalyst particles having a diameter above about 10 microns, for example, in the range of about 10 to 250 microns and preferably 20 to 150 microns.

By fines is meant solid particles having a diameter of about 10 microns or less, for example, from in the range of about 0.1 to 10 microns.

As shown in FIG. 1, a valve 21 may be provided for controlling when slurry is withdrawn from the downcomer.

Optionally, the overflow from hydrocyclone 14 is fed to a second hydrocyclone 22 for further segregation of the particles where larger catalyst particles are collected in the underflow and transferred via conduit 23 to a catalyst regeneration system feed tank or are returned via line 23a to reactor 10 while the smaller particles collected in the overflow stream are transferred via conduit 24 to a collection drum, for example.

Figure 2:
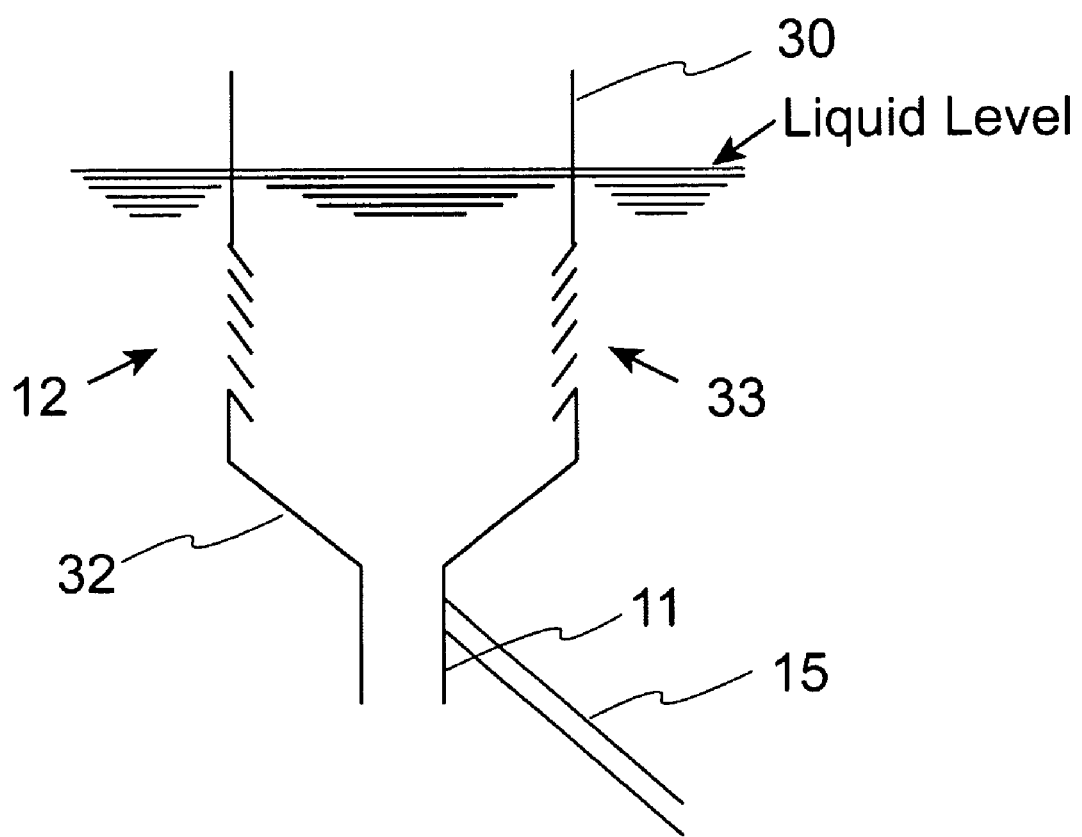
FIG. 2 is a schematic diagram of a degassing downcomer cup in accordance with one embodiment of the invention.

In one embodiment of the invention shown in FIG. 2, cup 12 of downcomer 9 comprises a cylindrical or rectangular body 30 which at its bottom end has downwardly sloping, funnel-like wall, 32, that terminates at the opening of section 11 of the downcomer 9. Body 30 is of sufficient length that it will extend above the liquid level in the reactor 10. The wall of body 30 is provided with a plurality of orifices located so that they are below the liquid level in the reactor 10. Communicating with the orifices is a plurality of inclined, parallel plates 33 that extend upwardly from the interior of cup 12 to the orifices in the wall of body 30 and define gas passages there between.

Typically, the orifices in body 30 will have dimensions that will allow enough slurry to flow into the cup as required by the downcomer and hydrocyclone hydraulic pressure balance so as to obtain the highest pressure drop possible between the hydrocyclone feed and underflow streams. The number and dimension of the orifices in body 30 are also specified to ensure that the slurry velocity in the orifices is such that small gas bubbles have time to coalesce in the inclined plates 33 at the orifices.

The inclined plates 33 operate to coalesce small gas bubbles and direct them out of cup 12.

Extending the body 30 above the liquid level in the reactor ensures that the slurry enters through the orifices and inclined plates 33, thereby improving the gas separation efficiency by avoiding bypassing over the top.

As shown, cup 12 is provided with conduit 15 for removal of degassed slurry for transfer to hydrocyclone 14.

Figure 3:
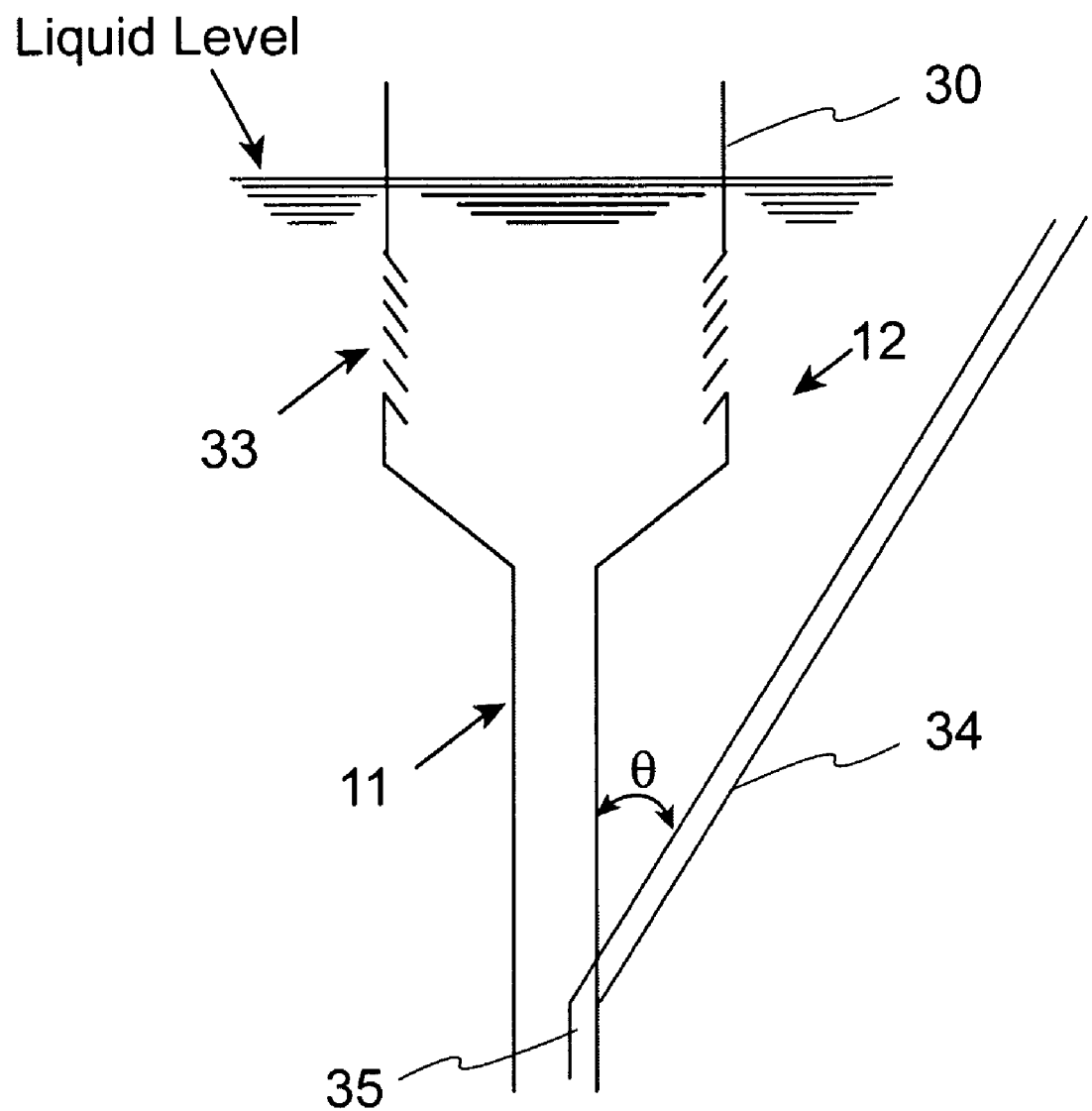
FIG. 3 is a schematic diagram of a degassing and slurry withdrawal system in accordance with another embodiment of the invention.

In an alternate embodiment shown in FIG. 3, cup 12 of downcomer 9 is provided with orifices communicating with inclined plates 33 as in FIG. 2; however, in the FIG. 3 embodiment, the fines slurry is withdrawn as a small stream from downcomer section 11 via conduit 34. Conduit 34 is oriented at an upwardly sloped angle θ. In this embodiment, due to the momentum of the catalyst particles in the downcomer 11, the coarser bulk catalyst particles flow past the drawoff line 34 with the bulk of the flow into the main slurry body. The fines that are dispersed in the liquid will be able to turn and leave with the small withdrawal stream in conduit 34. The drawoff conduit 34 is inclined at an angle θ, to allow any coarse particles entering conduit 34 to settle out and flow back into the main downcomer section 11. In this embodiment, it is preferred that an internal baffle, 35, be positioned in downcomer section 11 to ensure that liquid flowing down the main downcomer section 11 carries a major portion of the bulk catalyst past the drawoff line 34. The drawoff conduit 34 also is sized such that the withdrawn stream is substantially less than the bulk of the stream in downcomer section 11.

Draw off line 34 extends upwardly for a sufficient distance to permit any bulk catalyst to settle out, the orientation of the line may be any convenient arrangement. For example, it may be sloped downward for communication with hydrocyclone 14. Optionally, line 34 may also be provided with a high point vent (not shown) to release any vapor that may be present in the withdrawn stream.

Figure 4:
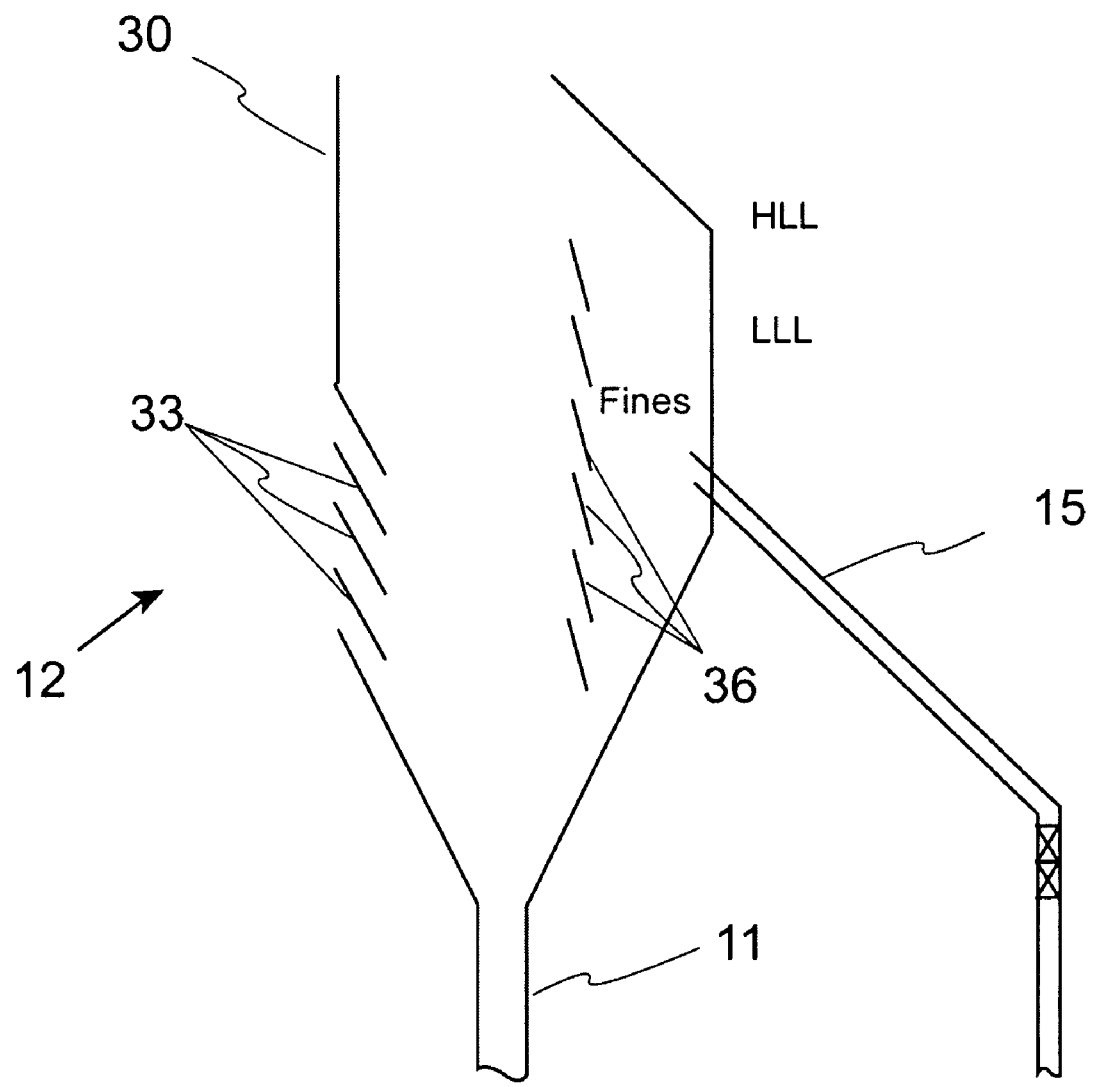
FIG. 4 is a schematic diagram of an alternate degassing and settling system useful in the practice of the invention.

In the FIG. 4 embodiment of the invention, cup 12 of downcomer 9 is provided with a plurality of internal baffles 36 that serve to minimize any turbulence or recirculation currents that might disturb the settling of the more coarse catalyst particles.

As previously explained, the cup 12 of downcomer 9 is designed to disengage gas and is positioned at the top of the reactor bed to facilitate venting of the gas into the reactor head space.

As will be appreciated, an advantage of the present invention is that by providing a means for removing fines from a three-phase slurry, the efficiency and life of filters used in three-phase slurry process may be extended.

Figure 5:
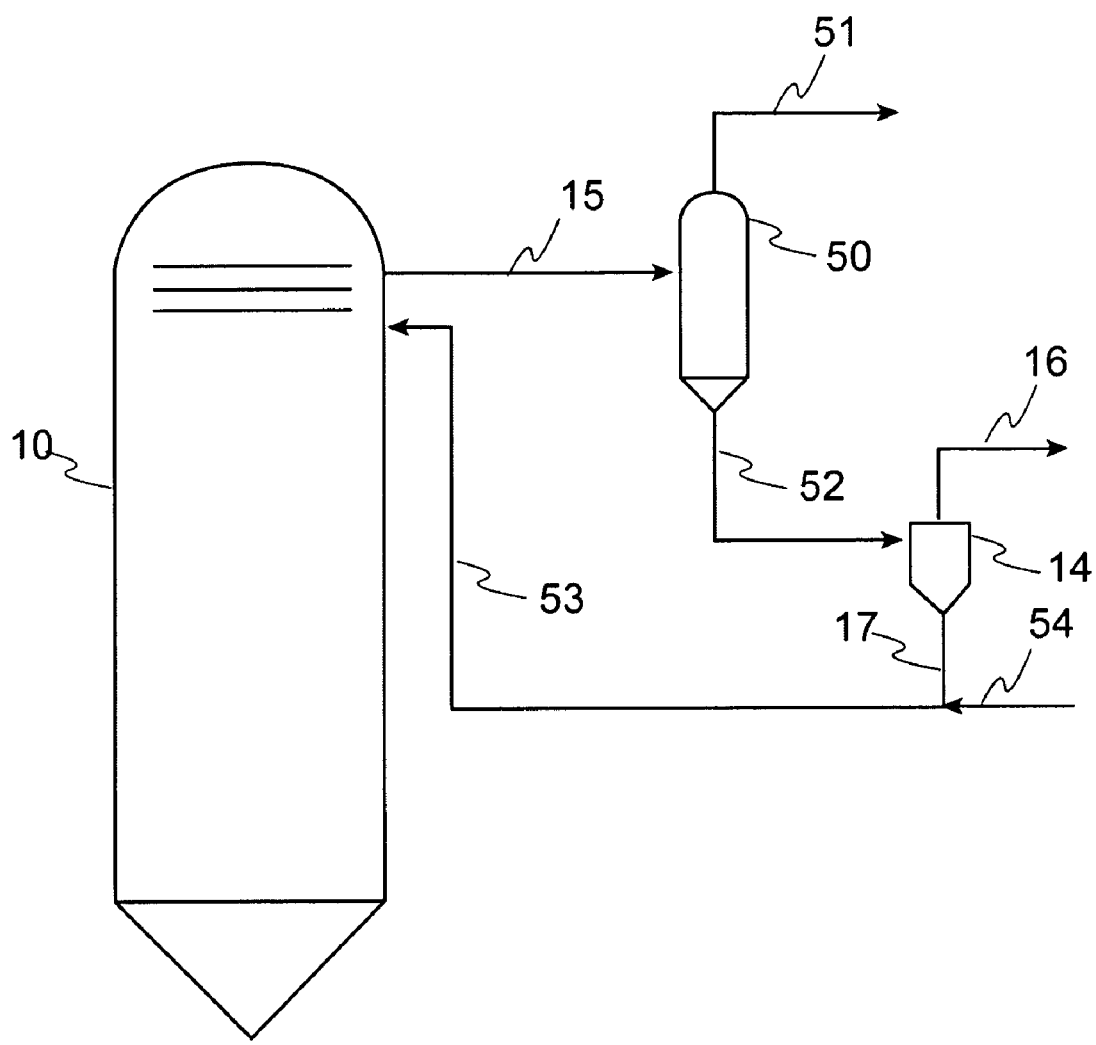
FIG. 5 is a schematic diagram illustrating an alternate embodiment of the invention wherein a slurry from a three-phase gas and slurry bubble column is degassed in an external degassing vessel for subsequent treatment in a hydrocyclone.

In an alternate and preferred embodiment of the invention shown in FIG. 5, a catalyst-containing slurry stream is removed from the top of vessel 10 via line 15. The removed slurry is then degassed in degassing vessel 50 in which gas is removed via overhead line 51 and degassed slurry is fed via line 52 to a first-stage hydrocyclone 14. As shown this first stage hydrocyclone 14 has a top conduit 16 for removal of an overflow stream of lowered solids loading and a bottom conduit 17 for removal of an underflow stream containing coarse solids. A riser 53 is in communication with conduit 17 and vessel 10 for returning the underflow stream 17 to vessel 10 by the injection of a lift gas, such as a hydrogen containing gas or an inert gas into the riser 53 via line 54. The overflow stream removed via conduit 16 may be treated as in the FIG. 1 embodiment.

The use of a riser 53 with a lift gas injection allows a relatively high pressure drop across the hydrocyclone 14 without the need for a pump to return the underflow slurry to the reactor.

Use of a hydrogen containing gas injection in the riser 53 also serves to rejuvenate the catalyst in the slurry before it returns to the reactor.

What is claimed is:

1. A method for separating bulk catalyst from fines in a three-phase gas and slurry mixture contained in a bubble column, the method comprising:
   degassing a portion of the gas and slurry mixture to provide a degassed slurry;
   lowering the solids loading in the degassed slurry to less than about 20 wt %; and
   passing the lowered solids-loaded slurry to a fines hydroclone for separation and removal of fines.

2. The method of claim 1 wherein the degassing of the portion of the slurry is sufficient to remove about 80 vol % of the gas therein.

3. The method of claim 2 wherein the degassing of the portion of the slurry is sufficient to remove substantially all of the gas therein.

4. The method of claim 3 wherein the degassing is conducted in a downcomer located in the bubble column and wherein the downcomer includes a cup wherein degassing and solids loading lowering occurs.

5. The method of claim 3 wherein the degassing is conducted in a degassing vessel located external to the bubble column.

6. The method of claim 5 wherein the output of the hydrocyclone comprises an overflow stream of lowered solids loading and a first underflow stream, and passing the overflow stream to a second fines hydroclone.

7. The method of claim 6 wherein the underfloor stream is returned to the bubble column.

8. The method of claim 7 wherein the underflow stream is returned to the bubble column through a riser by injecting a lift gas into the riser.

9. The method of claim 8 wherein the lift gas is a hydrogen-containing gas.

10. A method for controlling the fines content in a three phase gas and slurry reactor, the method comprising:
    degassing a portion of the slurry to provide a degassed slurry;
    lowering the solids loading in the degassed slurry to less than about 20 wt %; and
    passing the lowered solids-loaded slurry to a fines hydroclone for separation and removal of fines.

11. The method of claim 10 wherein the degassing of the portion of the slurry is degassed sufficiently to remove about 90 vol % of the gas therein.

12. The method of claim 11 wherein the degassing of the slurry is degassed to remove substantially all of the gas therein, and the solids content of the degassed slurry is lowered to less than about 20 wt %.

13. In a Fischer-Tropsch hydrocarbon synthesis process wherein synthesis gas is reacted in the presence of catalyst particles and a liquid in the form of a three-phase slurry in a bubble column to form predominately liquid hydrocarbons, the improvement comprising:
    degassing a portion of the slurry to provide a degassed slurry;
    lowering the solids loading in the degassed slurry to less than about 20 wt %;
    introducing the slurry of lowered solids loading into a fines hydroclone for fines separation therein.

14. The improvement of claim 13 wherein the portion of the slurry is degassed and its solids content lowered in a gas disengaging cup located in the bubble column.

15. The improvement of claim 13 wherein the portion of slurry is degassed in a vessel located out of the bubble column wherein the degassed slurry is introduced into the hydrocyclone to provide an overflow stream of lowered solids content and an underflow stream comprising coarse catalyst and wherein the overflow stream of lowered solids content is introduced into a second fines hydroclone for separation of fines therefrom.

16. The improvement of claim 14 or 15 wherein the portion of slurry is degassed sufficiently to remove about 80 vol % of the gas therein.

17. The improvement of claim 14 wherein a stream of the degassed and lowered solids content slurry passes downwardly through a downcomer from the gas disengaging cup into the bubble column while a portion of the stream in the downcomer is withdrawn for introduction into the fines hydroclone.

\* \* \* \* \*